Figure 1:
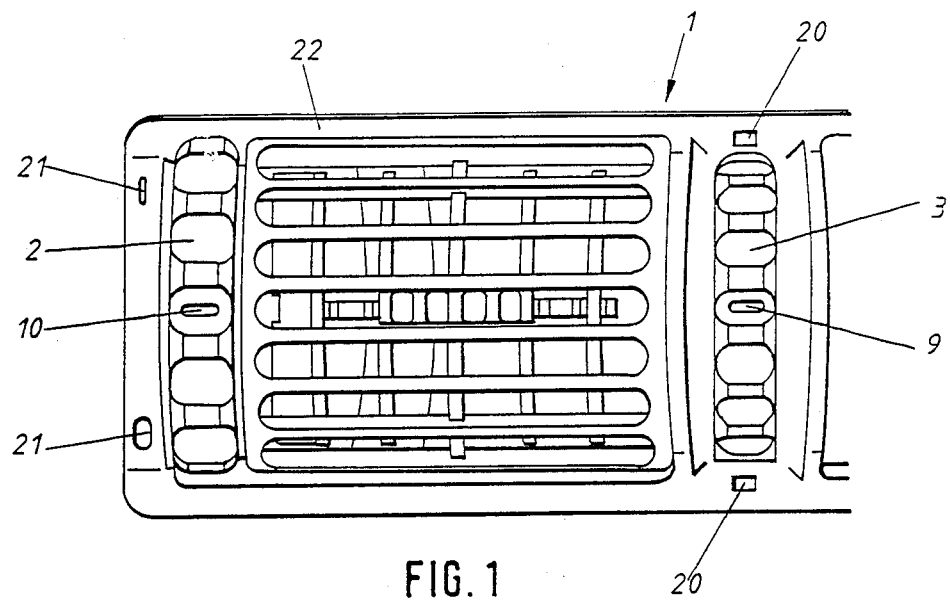

United States Patent [19]

Schiele

[11] Patent Number: 4,916,591
[45] Date of Patent: Apr. 10, 1990

[54] ILLUMINATED REGULATING DEVICE FOR VEHICLE VENTILATION

[75] Inventor: Güenter Schiele, Augsburg, Fed. Rep. of Germany

[73] Assignee: Hoerauf & Kohler KG, Augsburg, Fed. Rep. of Germany

[21] Appl. No.: 383,937

[22] Filed: Jul. 21, 1989

[30] Foreign Application Priority Data

Dec. 3, 1988 [DE] Fed. Rep. of Germany ... 8815072[U]

[51] Int. Cl.⁴ .......................................... G01D 11/28
[52] U.S. Cl. .......................................... 362/74; 98/2;
362/26; 362/30; 362/80; 362/96
[58] Field of Search .................. 98/2; 362/32, 74, 80,
362/96, 26, 30

[56] References Cited

U.S. PATENT DOCUMENTS

| | | | |
|---|---|---|---|
| 2,290,278 | 7/1942 | Failla | 362/32 X |
| 2,536,557 | 1/1951 | Levesque | 362/26 X |
| 2,993,985 | 7/1961 | Scrabonia | 362/26 |
| 4,800,466 | 1/1989 | Bauer | 362/32 X |
| 4,823,238 | 4/1989 | Bauer et al. | 98/2 X |
| 4,841,415 | 6/1989 | Dobner | 362/32 X |
| 4,845,595 | 7/1989 | Fujii et al. | 362/30 |

Primary Examiner—Harold Joyce
Attorney, Agent, or Firm—Flynn, Thiel, Boutell & Tanis

[57] ABSTRACT

In an illuminated regulating device for operating a ventilation arrangement or the like in a motor vehicle, in the vicinity of a regulating wheel (2, 3) rotatable about its axis are provided several light outlets (13b, 14b) arranged stationarily and at the circumference of the regulating wheel is provided a movable light outlet (11a, 12a). The light outlets (11a, 12a, 13b, 14b) are formed by inserts of clear, rigid plastic and are connected to a common light source (16, 17) by light conducting inserts (11, 12, 13, 14). All stationary light outlets (13b, 14b) are formed at the ends of arms (13a, 14a) of a single-piece light conducting insert (13, 14) with total internal reflection made of clear, rigid plastic, which extends from the light source (16, 17) to the light outlets (13b, 14b). This light conducting insert (13, 14) is provided with a lateral light outlet surface (13d, 14d) in the region of the axis of rotation (A) of the regulating wheel (2, 3). In the regulating wheel (2, 3) is provided a single-piece light conducting insert (11, 12) with total internal reflection made of clear, rigid plastic, which extends from the movable light outlet (11a, 12a) to the region of the axis of rotation (A), at the radially outer end of which is formed the light outlet (11a, 12a) and at the radially inner end of which is provided a light inlet surface (11b, 12b) extending in a radial plane and opposite the light outlet surface (13d, 14d).

5 Claims, 3 Drawing Sheets

ILLUMINATED REGULATING DEVICE FOR VEHICLE VENTILATION

The invention concerns an illuminated regulating device for operating a ventilation arrangement or the like in a motor vehicle, with at least one regulating wheel rotatable about its axis, with several light outlets arranged stationarily in the vicinity of the regulating wheel, with a movable light outlet provided at the circumference of the regulating wheel and with a common light source, wherein the light outlets are formed by inserts of clear, rigid plastic and are connected to the common light source by light conducting elements made of clear plastic with total internal reflection.

In order to facilitate operation of the regulating wheels of ventilation arrangements or the like for the motorist at night and thus increase driving safety, there is known the concept of providing on the regulating wheel itself and in its vicinity light outlets which can also be marked by special symbols or in colour. In order to manage with as small a number of light sources i.e. bulbs as possible, the light from a single light source is conducted to several light outlets by means of flexible fibre optic cables. These flexible fibre optic cables consist of a clear plastic wire with a diameter of about 1 mm and a sheath of opaque material. As three light outlets are provided in the region of each regulating wheel in the known regulating device, there must be three fibre optic cables the ends of which must be connected and held by a connecting piece in the region of the light source. In order that the other ends of the fibre optic cables do not slip out of the inserts, they are surrounded by metal bushes which fit in corresponding bores of the inserts.

The manufacture and assembly of such fittings composed of three fibre optic cables are possible through few specialist firms only. Due to the high production cost, these fittings are expensive. In addition, the three inserts have to be manufactured and assembled. If assembly of the fibre optic cables is not performed carefully, their ends may slip out of the bores of the inserts, so that the insert concerned is then no longer illuminated.

It is the object of the invention to provide an illuminated regulating device for operation of a ventilation arrangement or the like in a motor vehicle of the kind mentioned hereinbefore, which with respect to the actual illuminating device consists of few parts which are easy to manufacture and easy to assemble, and is thus cheaper to manufacture as well as extremely reliable in operation.

According to the invention, this is achieved by the fact that all stationary light outlets are formed at the ends of arms of a single-piece light conducting insert with total internal reflection made of clear, rigid plastic, which extends from the light source to the light outlets, this light conducting insert is provided with a lateral light outlet surface in the region of the axis of rotation of the regulating wheel, and in the regulating wheel is provided a single-piece light insert with total internal reflection made of clear, rigid plastic, which extends from the movable light outlet to the region of the axis of rotation, at the radially outer end of which is formed the light outlet and at the radially inner end of which is provided a light inlet surface extending in a radial plane and opposite the light outlet surface.

In the new illuminated regulating device, the illuminating device consists of practically only three parts, namely the actual light source and the two light conducting inserts. These light conducting inserts simultaneously serve to form the three light outlets and also for optical communication between the light outlets and the light source. The light conducting inserts can be made in appropriate injection molds very easily and with appropriate quantities also relatively cheaply. The insert in the regulating wheel is inserted in a corresponding recess thereof and held there, as is usual for plastic components, by appropriate undercutting or clamping action. In the same way the light conducting insert is inserted in corresponding recesses of the stationary housing too. Any metal parts and fitting them are eliminated. Insertion of the light conducting inserts can be carried out quickly and reliably, nor is there any risk of incorrect assembly.

Advantageous developments of the invention are characterized in the subsidiary claims.

Figure 2:
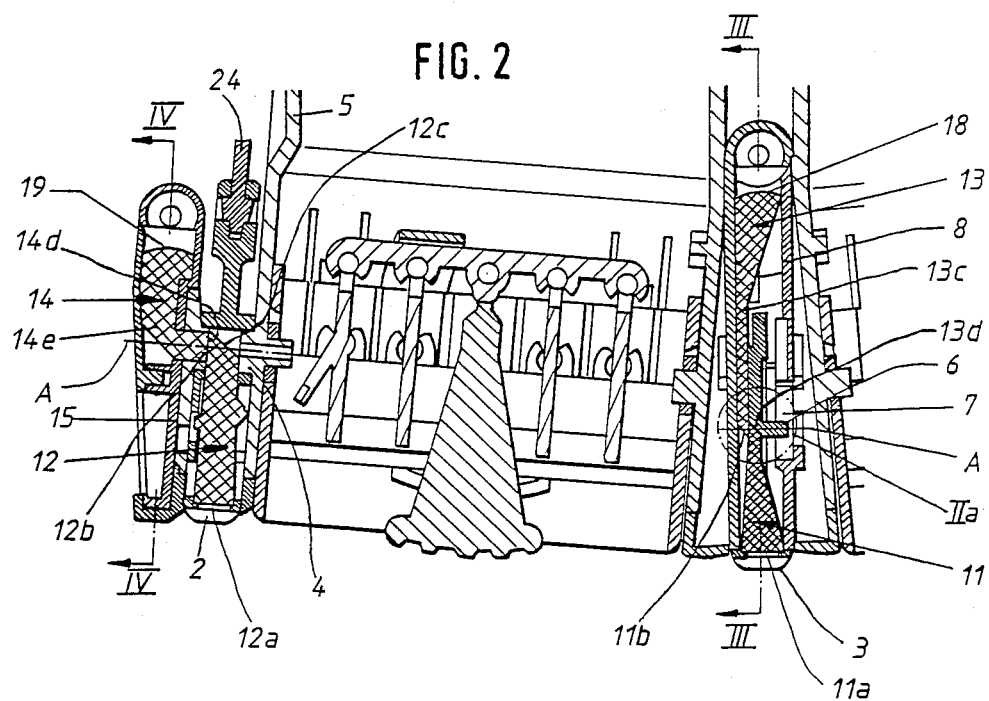
Figure 2A:
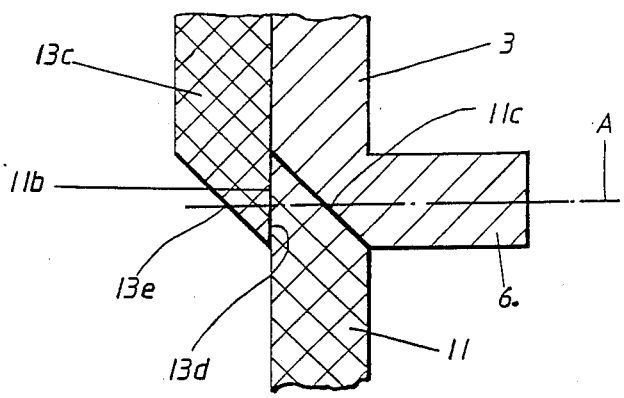
Figure 3:
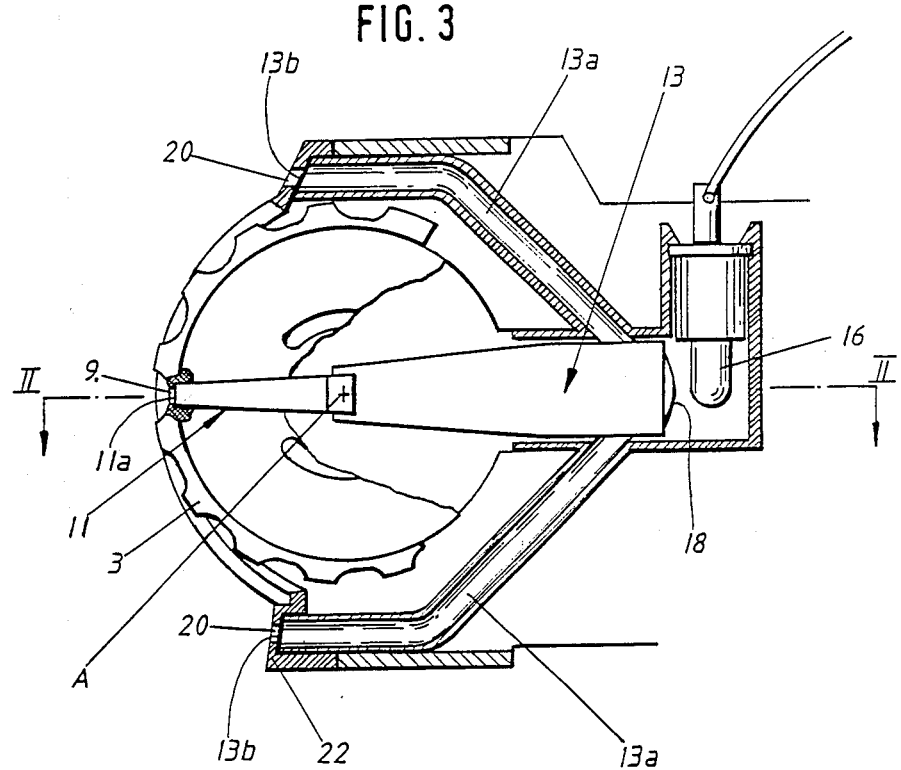
Figure 4:
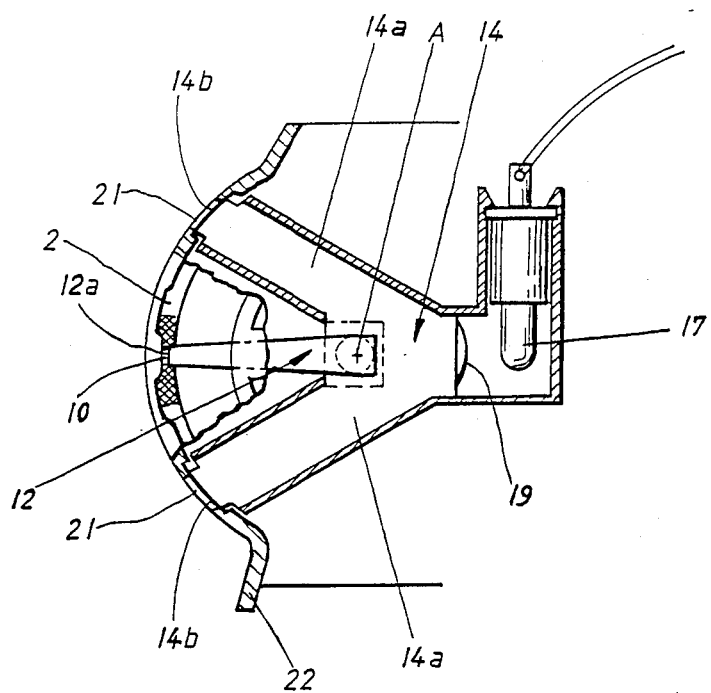

The invention is explained in more detail below with reference to a practical example with two differently designed regulating wheels. The drawings show: FIG. 1 an outside view of a ventilation arrangement for a motor vehicle with the illuminated regulating device according to the invention, FIG. 2 a horizontal section through line II—II of FIG. 3, FIG. 2a details at point IIa of FIG. 2, FIG. 3 a vertical section through line III—III of FIG. 2, FIG. 4 a vertical section approximately through line IV—IV of FIG. 2.

The ventilation arrangement 1 shown in the drawings for a motor vehicle comprises a total of three regulating devices which are each fitted with a regulating wheel 2, 3 rotatable about its axis A. The third regulating device is not shown in the drawings; it corresponds in inverse symmetry to the regulating device shown on the left in the drawings. An air valve, not shown, with which the air supply is regulated, is operated via a lifting linkage 24 by means of the regulating wheel 2. The regulating wheel 2 is mounted rotatably on a journal 4 of the housing section 5. On the other hand the regulating wheel 3 comprises a journal 6 which engages in a potentiometer 7. The potentiometer 7 is rigidly anchored in the housing section 8. By means of this potentiometer the air temperature can be regulated.

In order to indicate the respective rotational position of the regulating wheels 2, 3 in the dark as well, a special illuminating device is associated with each of the regulating wheels. Each of the regulating wheels 2, 3 comprises a slotlike aperture 9, 10 at its circumference. In each regulating wheel 2, 3 is also provided a single-piece light insert 11, 12. This single-piece light insert 11, 12 extends from the aperture 9, 10 as far as the region of the axis of rotation A. At the radially outer end of each light conducting insert 11, 12 is formed a light outlet 11a, 12a. In the region of the axis of rotation A, each light conducting insert 11, 12 comprises a light inlet surface 11b, 12b. Also, in the region of the axis of rotation is provided a reflection surface 11c, 12c inclined at 45° to the latter.

In housing section 8 of the regulating wheel 11 is disposed a light conducting insert 13, an in housing section 15 a light conducting insert 14. Each of the two light conducting inserts 13, 14 comprises two arms 13a, 14a at the free ends of which are formed light outlets 13b, 14b. The two light conducting inserts 13, 14 each extend as far as a light source 16, 17. The light inlet surface 18, 19 of the light conducting inserts 13, 14, which is opposite the light source 16, 17, is appropriately designed as a convex lens. Light conducting insert 13 comprises a third arm 13c which extends as far as the region of the axis of rotation A. There the arm 13c is provided with a light outlet surface 13d which is opposite the light inlet surface 11c. Both lie in a plane extending radially to the axis of rotation A. Moreover, on the ar 13c in the region of the axis of rotation A is provided a reflection surface 13e inclined at 45° to the latter.

Light conducting insert 14 is also provided, in the region of the axis of rotation A, with a light outlet surface 14d which is opposite the light inlet surface 12b provided on light conducting insert 12. Moreover light conducting insert 14 in the region of the axis of rotation A comprises a reflection surface 14e inclined at 45° to the latter.

The light conducting inserts 11–14 are made of clear, rigid plastic and have total internal reflection. In order to achieve this total internal reflection, the light conducting inserts 11–14 have a polished surface which can be obtained by polishing the corresponding injection molds. The light conducting inserts 11–14 are appropriately made of acrylic glass or polycarbonate.

The light outlets 13b, 14b of light conducting inserts 13 are disposed behind corresponding apertures which are provided in a plastic shield 22.

In order to avoid any disturbing emergence of light in places where no light is supposed to emerge, it is advisable if the light conducting inserts 11–14 with the exception of light outlets 11a, 12a, 13b, 14b as well as the light inlet and outlet surfaces 11b, 12b, 13d, 14d, 18, 19 are surrounded by walls of opaque material. These walls may be parts of housing sections, or parts of the regulating wheels 2, 3. For reasons of clarity, these walls have been partly omitted from the drawings.

The mode of operation is as follows:

The light radiated by light source 17 enters light conducting insert 14 via light inlet surface 19. As total reflection takes place at its walls, the light is passed on almost without loss in light conducting insert 14. It emerges at light outlets 14b and passes through the apertures 21. The apertures 21 may be shaped appropriately or have coloured inserts, so that they form symbols for operation of the ventilation arrangement. The light introduced into light conducting insert 14 also passes to reflection surface 14e which acts after the fashion of a mirror and deflects the light rays in the direction of the axis A. The light emerges at light outlet surface 14d from light conducting insert 14 and enters light conducting insert 12 via light inlet surface 12b. Here it is again deflected at reflection surface 12c, so that it is now directed radially outwards and passes to light outlet 12a. There the aperture 10 is illuminated. The same also applies to light conducting inserts 11 and 13.

I claim:

1. Illuminated regulating device for operating a ventilation arrangement or the like in a motor vehicle, with at least one regulating wheel rotatable about its axis, with several light outlets arranged stationarily in the vicinity of the regulating wheel, with a movable light outlet provided at the circumference of the regulating wheel and with a common light source, wherein the light outlets are formed by inserts of clear, rigid plastic and are connected to the common light source by light conducting elements made of clear plastic with total internal reflection, characterized in that all stationary light outlets (13b, 14b) are formed at the ends of arms (13a, 14a) of a single-piece light conducting insert (13, 14) with total internal reflection made of clear, rigid plastic, which extends from the light source (16, 17) to the light outlets (13b, 14b), said light conducting insert (13, 14) is provided with a lateral light outlet surface (13d, 14d) in the region of the axis of rotation (A) of the regulating wheel (2, 3), and in the regulating wheel (2, 3) is provided a single-piece light insert (11, 12) with total internal reflection made of clear, rigid plastic, which extends from the movable light outlet (11a, 12a) to the region of the axis of rotation (A), at the radially outer end of which is formed the light outlet (11a, 12a) and at the radially inner end of which is provided a light inlet surface (11b, 12b) extending in a radial plane and opposite the light outlet surface (13d, 14d).

2. Device according to claim 1, characterized in that both light conducting inserts (11–14) lie essentially in planes extending radially to the axis of rotation (A) and comprise reflection surfaces (11c, 12c, 13e, 14e) after the fashion of prisms inclined at 45° to the axis of rotation (A) in the region of the latter.

3. Device according to claim 1 characterized in that the light inlet surface (18, 19) of the light conducting insert (13, 14) opposite the light source (16, 17) is designed as a convex lens.

4. Device according to claim 1 characterized in that the light conducting inserts (11–14) are made of acrylic glass or polycarbonate.

5. Device according to claim 1 characterised in that the light conducting inserts (11–14) with the exception of the light outlets (11a, 12a, 13b, 14b) as well as light inlet and outlet surfaces (11b, 12b, 13d, 14d) are surrounded by walls made of opaque material.

* * * * *

UNITED STATES PATENT AND TRADEMARK OFFICE
CERTIFICATE OF CORRECTION

PATENT NO. : 4 916 591
DATED : April 10, 1990
INVENTOR(S) : Guenter SCHIELE

It is certified that error appears in the above-identified patent and that said Letters Patent is hereby corrected as shown below:

On the first page of the patent, please change the inventor's first name from "Güenter" to ---Guenter---.

Signed and Sealed this

Twenty-fourth Day of December, 1991

Attest:

HARRY F. MANBECK, JR.

*Attesting Officer*     *Commissioner of Patents and Trademarks*